(12) United States Patent
Wilson

(10) Patent No.: US 7,110,992 B2
(45) Date of Patent: Sep. 19, 2006

(54) SEARCHABLE LOGICAL DOCUMENT ARCHITECTURE

(75) Inventor: John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 09/751,869

(22) Filed: Dec. 29, 2000

(65) Prior Publication Data

US 2002/0087597 A1 Jul. 4, 2002

(51) Int. Cl.
*G06F 7/00* (2006.01)
*G06F 17/00* (2006.01)

(52) U.S. Cl. .......................................... 707/3; 707/100

(58) Field of Classification Search .................... 707/1, 707/2, 3, 104.1, 100
See application file for complete search history.

(56) References Cited

U.S. PATENT DOCUMENTS

| | | | |
|---|---|---|---|
| 5,408,655 A | | 4/1995 | Oren et al. |
| 5,742,816 A | | 4/1998 | Barr et al. |
| 5,832,476 A | * | 11/1998 | Tada et al. ...................... 707/2 |
| 5,987,472 A | * | 11/1999 | Serafin .................... 707/104.1 |
| 6,094,649 A | | 7/2000 | Bowen et al. |
| 6,553,364 B1 | * | 4/2003 | Wu ................................ 707/1 |
| 6,738,759 B1 | * | 5/2004 | Wheeler et al. ................ 707/3 |
| 2001/0007987 A1 | * | 7/2001 | Igata ............................ 707/3 |

* cited by examiner

*Primary Examiner*—Sam Rimell
(74) *Attorney, Agent, or Firm*—Scully, Scott, Murphy & Presser; William E. Schiesser, Esq.

(57) ABSTRACT

A method and system for searching a collaborative document database. The method comprises the steps of providing parent documents and child documents in said database; and for each parent document, building an index document listing a portion of said child documents. The method comprises the further steps of providing a search term, and searching all said index documents for said search term. Preferably, each child document is related to at least one of the parent documents; and the building step includes the step of identifying in the index document for each parent document, at least some of the child documents related to the parent document. With this embodiment, the searching step may include the step of, for each parent document, searching for the search term in the child documents identified in the index document for the parent document.

15 Claims, 3 Drawing Sheets

SEARCHABLE LOGICAL DOCUMENT ARCHITECTURE

BACKGROUND OF THE INVENTION

1. Field of the Invention

This invention generally relates to searching computer databases, and more specifically, the invention relates to searching a collaborative document database.

2. Prior Art

In a collaborative document database system, there may be the concept of a logical document, where a parent document may have attached multiple children documents. Such systems do not usually store the data in these documents in a relational database. Instead, the documents are stored in a proprietary format and related documents may be only weakly linked or associated. Even though the data are not stored with the relational model, querying for individual documents is normally not a problem, as the document database system may be equipped with a full text search engine.

A problem may occur, however, when querying against a logical document as a whole. For example, a query may need to find all the criminal investigations where "John Doe" and "Tom Smith" were involved. With reference to FIG. 1, if "John Doe" was located in the data for Suspect 1 and "Tom Smith" was in the data contained by the Suspect 2 child document, the query would fail. It would not find the logical document that contained both of these suspects.

SUMMARY OF THE INVENTION

An object of this invention is to provide a method and system that supports the searching for data within a complete logical document.

Another object of the present invention is to allow the restriction of returned data query results based on including singleton fields from a parent document in an index document.

These and other objectives are attained with a method and system for searching a collaborative document database. The method comprises the steps of providing parent documents and child documents in said database; and for each parent document, building an index document listing a portion of said child documents. The method comprises the further steps of providing a search term, and searching all said index documents for said search term.

Preferably, each child document is related to at least one of the parent documents; and the building step includes the step of identifying in the index document for each parent document, at least some of the child documents related to the parent document. With this embodiment, the searching step may include the step of, for each parent document, searching for the search term in the child documents identified in the index document for the parent document.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
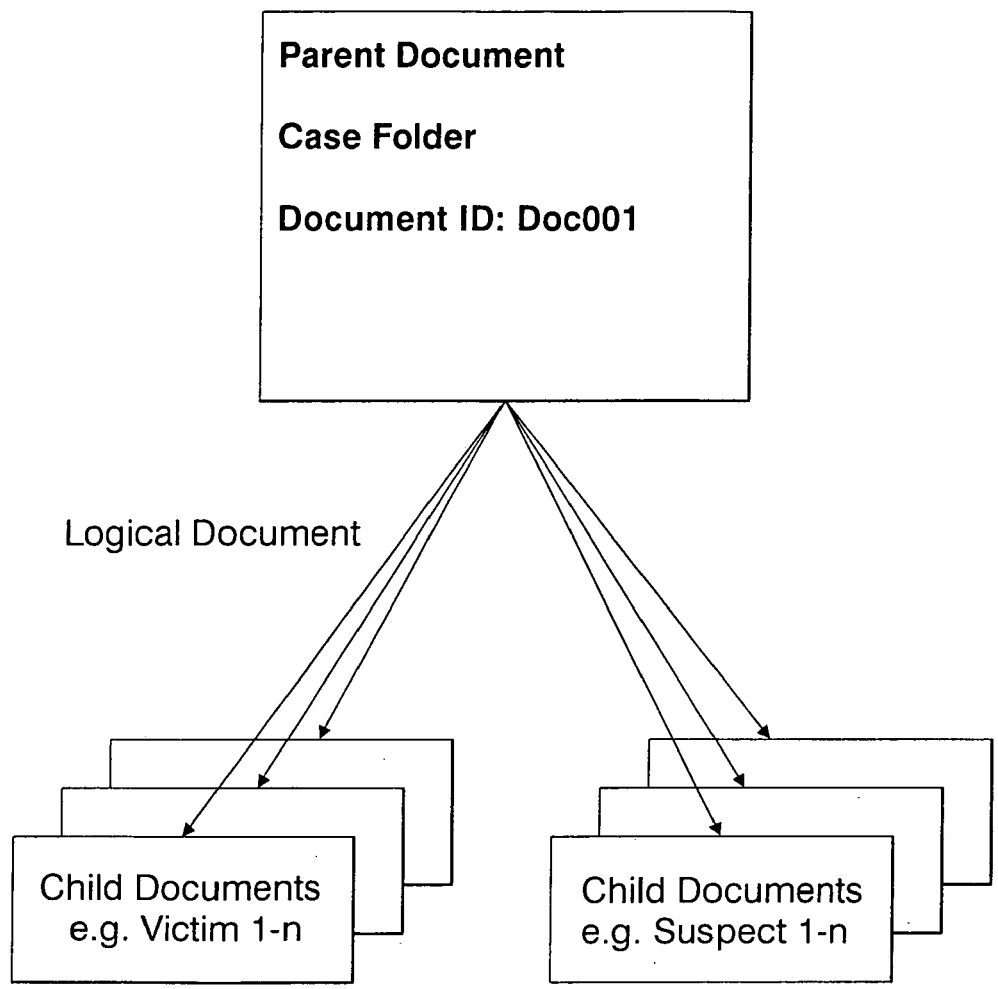
FIG. 1 shows a collaborative document database.
Figure 2:
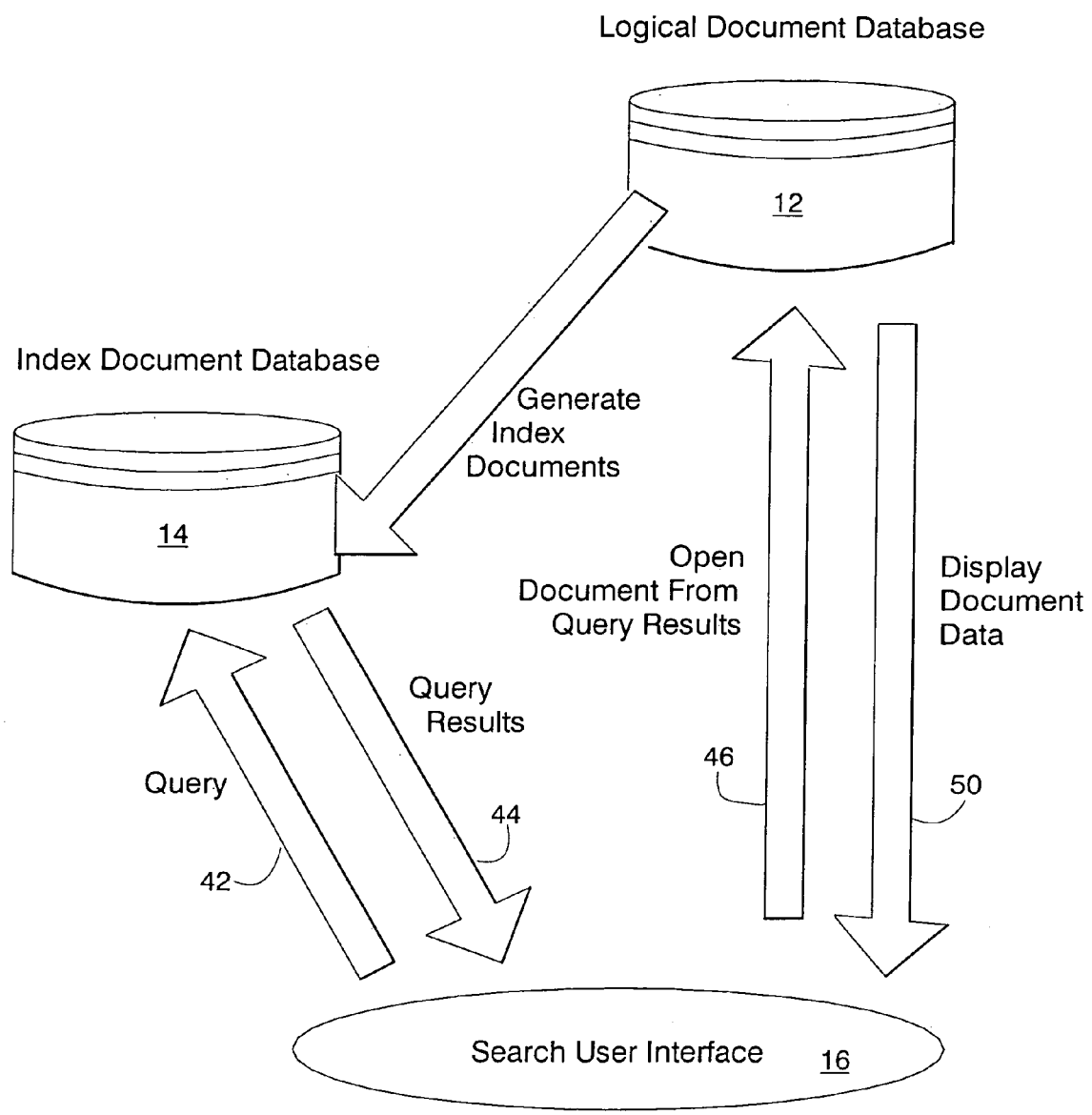
FIG. 2 illustrates a searchable logical document architecture.

FIG. 2 shows two databases 12 and 14. Database 12 contains the actual logical documents while database 14 contains index documents. The index document database is full text indexed periodically. Both databases may be on a suitable server (not shown). Further, a typical document search graphical user interface (GUI) 16 is supplied. With the particular embodiment illustrated in FIG. 2, this GUI is hosted within the logical document database space, but this is not necessary to the practice of this invention. The search user interface 16 can be provided by any suitable user interface, and many suitable user interfaces are well known in the art.

Figure 3:
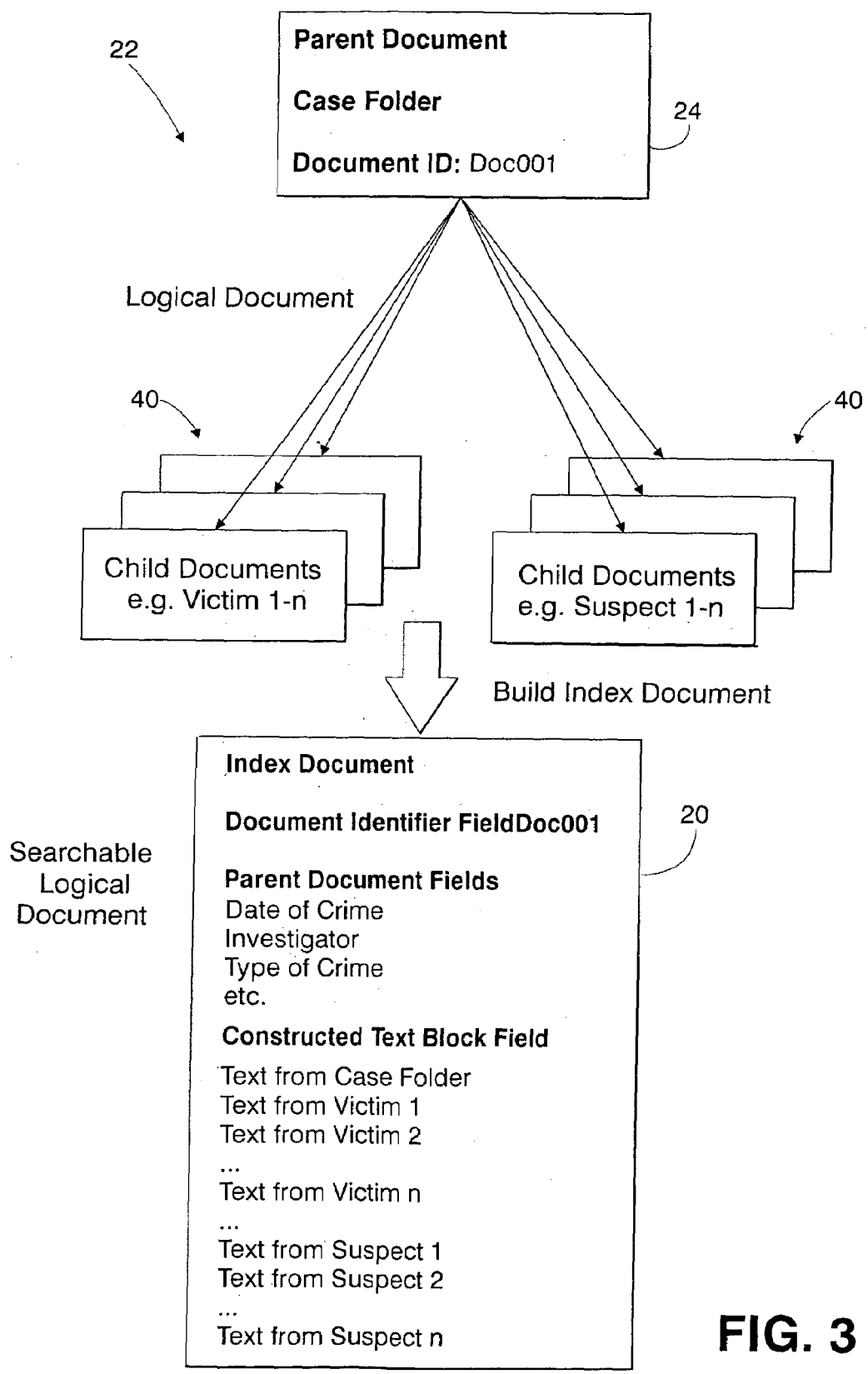
FIG. 3 shows an index document architecture embodying the present invention.

FIG. 3 depicts how an index document 20 may be built from a logical document 22. The preferred method used to actually create the index document is as follows:

1. Find the new or modified parent 24 or descendant documents in the document database on the server.
2. Find the index document 20 for the logical document-parent in the index database.
3. Clear the data in the index document.
4. Take selected singleton field items (such as the singleton items that are considered most important) from the logical document parent and place those field items as fields on the index document.
5. Proceed through the parent document and take all text and place that text in search text fields on the index document.
6. Proceed through the hierarchy of remaining child documents 40 in the logical document.
7. Obtain all the text data from each child and concatenate that text to the data in the search text block field on the index document.
8. Update the full text index on the index database.

FIG. 2 also shows how this system may be used. As new or modified documents occur on the logical document database 12, index documents are generated and placed in the index document database 14. The index document database 14 is periodically full text indexed.

The search user interface 16 generates queries 42 that run against the index document database 14. Query results 44 are returned to the user interface 16 as a list of logical document references. When a user, as represented at 46, selects one of these references, the logical document is returned, as represented at 50, from the logical document database 12.

The specific fields that are included in the index document are useful to limit data returned from the query 22. For example, the query could be built to specify that the "Date of Crime" field can only contain dates within a certain time frame.

The present invention, as described above, provides the ability to apply a full text query expression across a collection of related documents. The following example illustrates this feature of the invention.

As an example, some kind of criminal incident occurs (say a murder). In the database 12, a document is saved for this case. Next, a witness shows up who had seen some one fleeing the scene wearing a pink dress. In the database 12, a supplementary document is saved with the witness's statement regarding the pink dress. Sometime later, some evidence is found, say 9 mm shells. In the database 12, another supplementary document is saved with the evidence of the 9 mm shells. Finally, there are some actual suspects. In the database 12, a supplementary document is saved with information about Joe Smith the primary suspect. Later, the case is closed because it could not be proved that Joe Smith committed the crime.

The case in the database 12 is a collection of separate documents, each reflecting some supplementary information about the case and possible corresponding to an actual paper document in the real world.

Years later, another murder occurs where a witness sees the perpetrator fleeing the scene in a pink dress and there are 9 mm shells left at the scene. It would be ideal to run a full text query that says: "Give me all the cases involving a (pink near dress) and (9 mm near shells)."

In a standard index as described in U.S. Pat. No. 5,742, 816, this query will not find the case described above because its database saves discrete documents and the expression (pink near dress) and (9 mm near shells) does not occur within a discrete document. Rather, each term is found in a different document.

With the present invention, in contrast, this case is found. This invention achieves this by creating and updating an index document for the parent document whenever a document in its hierarchy changes. Essentially, a collection of documents is changed into a master document.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of searching a collaborative document database, comprising the steps of:
   providing said database with a plurality of parent documents and a plurality of child documents, each of said child documents being related to at least one of the parent documents in said database;
   for each of the parent documents, combining said parent document and the child documents related to said parent document, into a master index document and storing the master index documents in an index document database separate from the collaborative document database, including
   i) taking selected field items from the parent document;
   ii) placing said selected field items as fields on the index document;
   iii) proceeding through the parent document and taking all text thereon and placing said all text from said parent document in said fields of the index document; and
   iv) proceeding through said related child documents, obtaining all text from each of said related child documents, and concatenating said all text from said related child documents to data in a search text block field of the index document;
   providing a search term; and
   searching all said index documents for said search term.

2. A method according to claim 1, wherein:
   the combining step includes the step of identifying in the index document for each parent document, at least some of the child documents related to the parent document.

3. A method according to claim 2, wherein the searching step includes the step of, for each parent document, searching for the search term in the child documents identified in the index document for the parent document.

4. A method according to claim 2, wherein the identifying step includes the step of identifying in the index document for each parent document, all of the child documents related to the parent document.

5. A method according to claim 2, wherein the identifying step includes the step of identifying in the index document for each parent document, only the child documents that both are related to the parent document and meet predefined criteria.

6. A method according to claim 1, wherein:
   the combining step includes the step, for each parent document, updating the index document for the parent document whenever one of the child documents related to the parent document changes; and
   the search term includes a plurality of words.

7. A system for searching a collaborative document database, comprising:
   means for providing said database with a plurality of parent documents and a plurality of child documents, each of said child documents being related to at least one of the parent documents;
   means for combining for each parent document, said parent document and the child documents related to said parent document, into a master index document, including
   i) means for taking selected field items from the parent document
   ii) means for placing said selected field items as fields on the index document;
   iii) means for proceeding through the parent document and taking all text thereon and placing said all text from said parent document in said fields of the index document; and
   iv) means for proceeding through said related child documents, obtaining all text from each of said related child documents, and concatenating said all text from said related child documents to data in a search text block field of the index document;
   an index document database separate from the collaborative document database for storing the master index documents;
   means far providing a search term; and
   means for searching all said index documents for said search term.

8. A system according to claim 7, wherein:
   the combining means includes the means for identifying in the index document for each parent document, at least some of the child documents related to the parent document.

9. A system according to claim 8, wherein the searching means includes means for searching, for each parent document, for the search term in the child documents identified in the index document for the parent document.

10. A system according to claim 8, wherein the identifying means includes the means for identifying in the index document for each parent document, all of the child documents related to the parent document.

11. A system according to claim 8, wherein the identifying means includes means for identifying in the index document for each parent document, only the child documents that both are related to the parent document and meet predefined criteria.

12. A program storage device readable by machine, tangibly embodying a program of instructions executable by the machine to perform method steps for searching a collaborative document database, said method steps comprising:

providing said database with a plurality of parent documents and a plurality of child documents, ach of said child documents being related to at least one of the parent documents;

for each of the parent documents, combining said parent document and the child documents related to said parent document, into a master index document and storing the master index documents in an index document database separate from the collaborative document database, including i) taking selected field items from the parent document;
ii) placing said selected field items as fields on the index document;
iii) proceeding through the parent document and taking all text thereon and placing said all text from said parent document in said fields of the index document; and
iv) proceeding through said related child documents, obtaining all text from each of said related child documents, and concatenating said all text from said related child documents to data in a search text block field of the index document;

providing a search term; and
searching all said index documents far said search term.

13. A program storage device according to claim 12, wherein:
the combining step includes the step of identifying in the index document for each parent document, at least some of the child documents related to the parent document.

14. A program storage device according to claim 13, wherein the searching step includes the step of, for each parent document, searching for the search term in the child documents identified in the index document for the parent document.

15. A method of searching a collaborative document database, comprising the steps of:

providing said database with a plurality of parent documents and a plurality of child documents, each of said child documents being related to at least one of the parent documents in said database;

for each of the parent documents, combining said parent document and the child documents related to said parent document, into a master index document and storing the master index documents in an index document database separate from the collaborative document database, including i) taking selected field items from the parent document;
ii) placing said selected field items as fields on the index document;
iii) placing text from said parent document in said fields of the index document; and
v) placing text from said related child documents in said fields of the index document;

providing a search term;
searching all said index documents for said search term;
wherein:
the combining step includes the steps of
i) finding a selected parent document in the document database,
ii) finding a selected index document in the index database for the selected parent document, and
iii) clearing data in the found index document;

the step of taking selected field items from the parent document includes the step of taking selected singleton field items from the found parent document;

the step of placing said selected field items as fields on the index document include the step of placing said selected singleton field items as fields on the found index document;

the step of placing text from said parent document in said fields of the index document includes the step of proceeding through the found parent document and taking all text thereon and placing said all text in said fields in the found index document;

the step of placing text from the related child documents in said fields of the index document includes the steps of
i) proceeding through a hierarchy of child documents,
ii) obtaining all text from each of said hierarchy of child documents, and
iii) concatenating said all text from each of said hierarchy of child documents to data in a search text block field on the found index document.

* * * * *